US009784847B1

(12) United States Patent
Barsby et al.

(10) Patent No.: US 9,784,847 B1
(45) Date of Patent: Oct. 10, 2017

(54) MULTIPLE GNSS CONSTELLATION TRACKING FOR A BLENDED NAVIGATION SOLUTION

(75) Inventors: Nigel G. Barsby, Palm Bay, FL (US); Angelo J. Joseph, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 584 days.

(21) Appl. No.: 13/162,148

(22) Filed: Jun. 16, 2011

(51) Int. Cl.
| | |
|---|---|
| G01S 19/35 | (2010.01) |
| G01S 19/40 | (2010.01) |
| G01S 19/42 | (2010.01) |
| G01S 19/52 | (2010.01) |
| G01S 19/25 | (2010.01) |
| G01S 19/33 | (2010.01) |

(52) U.S. Cl.
CPC .............. *G01S 19/40* (2013.01); *G01S 19/35* (2013.01); *G01S 19/42* (2013.01); *G01S 19/52* (2013.01); *G01S 19/258* (2013.01); *G01S 19/33* (2013.01)

(58) Field of Classification Search
CPC ........ G01S 19/258; G01S 19/33; G01S 19/35; G01S 19/40; G01S 19/42; G01S 19/52; G01S 19/28; G01S 19/36; G01S 19/20; G01S 19/21; G01S 19/22
USPC .............. 342/357.23, 357.25, 357.35, 357.2, 342/357.75, 357.58–357.61, 357.67, 342/357.73, 357.76
See application file for complete search history.

(56) References Cited

U.S. PATENT DOCUMENTS

| | | | | |
|---|---|---|---|---|
| 5,574,649 A | * | 11/1996 | Levy | G01C 21/30 340/436 |
| 5,619,211 A | * | 4/1997 | Horkin | H04B 7/18508 342/352 |
| 5,627,546 A | * | 5/1997 | Crow | G01S 13/765 342/32 |
| 5,952,961 A | * | 9/1999 | Denninger | G01S 7/4004 342/357.3 |
| 6,512,976 B1 | * | 1/2003 | Sabatino | G01C 21/005 342/357.36 |
| 7,305,303 B2 | * | 12/2007 | Soehren | G01C 21/165 342/357.59 |
| 7,362,264 B2 | * | 4/2008 | Landmark | 342/357.59 |
| 7,990,315 B2 | * | 8/2011 | Chen | G01S 19/33 342/357.72 |
| 8,115,675 B2 | * | 2/2012 | Warloe et al. | 342/357.73 |
| 8,305,265 B2 | * | 11/2012 | Ezal | G01C 21/005 342/357.36 |
| 8,405,546 B1 | * | 3/2013 | Yeh | G01S 19/33 342/357.73 |
| 8,493,268 B2 | * | 7/2013 | Warloe | G01S 19/33 342/357.75 |
| 2008/0119157 A1 | * | 5/2008 | Watanabe | 455/302 |

(Continued)

*Primary Examiner* — Chuong P Nguyen
(74) *Attorney, Agent, or Firm* — Angel N. Gerdzhikov; Donna P. Suchy; Daniel M. Barbieri

(57) ABSTRACT

The present invention is a method for dynamically determining a blended navigation solution for a mobile platform (ex.—aircraft) via a receiver implemented on-board the platform. In the method disclosed herein, the receiver concurrently utilizes data from satellite signals obtained from a plurality of independent satellite constellations in calculating its (the receiver's) navigation solution (ex.—Position, Velocity, Time (PVT) solution), thereby overcoming weaknesses inherent in currently available systems and methods, which rely on only a single satellite constellation.

16 Claims, 2 Drawing Sheets

(56) References Cited

U.S. PATENT DOCUMENTS

2012/0268321 A1* 10/2012 Brekke ................... G01S 19/11
                                                342/357.29
2015/0378028 A1* 12/2015 Friedman ................ G01S 19/39
                                                342/357.22

* cited by examiner

MULTIPLE GNSS CONSTELLATION TRACKING FOR A BLENDED NAVIGATION SOLUTION

FIELD OF THE INVENTION

The present invention relates to the field of navigation systems and particularly to system(s) and method(s) for performing multiple Global Navigation Satellite System (GNSS) constellation tracking for providing a blended navigation solution.

BACKGROUND OF THE INVENTION

Currently, aircraft system architectures (ex.—aircraft platforms) rely on heavy, expensive subsystems, such as an inertial reference unit (IRU) and/or an inertial navigation system (INS) for supplying or augmenting their navigation solutions. However, implementing an IRU and/or an INS within such architectures may not be very efficient in terms of Size, Weight, Power and Cost (SWAP-C) considerations. Thus, it would be desirable to provide a system which obviates the above-referenced problems associated with the above-referenced current solutions.

SUMMARY OF THE INVENTION

Accordingly, an embodiment of the present invention is directed to a receiver, including: a Radio Frequency (RF) front end configured for receiving a plurality of RF inputs, the RF inputs including satellite signals received via an antenna array from a plurality of navigation satellite constellations, the antenna array being communicatively coupled to the receiver, the RF front end being further configured for processing the RF inputs to provide digital data; a core engine, the core engine being communicatively coupled to the RF front end, the core engine being configured for receiving the digital data from the RF front end, the core engine including a processor, the processor configured for processing the digital data, including separating the digital data into a first digital data portion and a second digital data portion based upon relative data integrity levels of digital data included in the digital data portions, the first digital data portion having a higher data integrity level than the second digital data portion; a navigation engine, the navigation engine being communicatively coupled to the core engine, the navigation engine configured for receiving the first digital data portion from the core engine, the navigation engine being further configured for receiving external sensor data inputs from an external sensor system, the external sensor system being communicatively coupled to the receiver, the navigation engine configured for processing the first digital data portion and the sensor data inputs to dynamically determine a navigation solution, the navigation solution being derived from the first digital data portion and the sensor data inputs, the navigation solution being a position, velocity and time (PVT) navigation solution for the receiver.

An additional embodiment of the present invention is directed to a method for determining a navigation solution via a receiver, the method including: receiving a plurality of RF inputs via a RF front end of the receiver, the plurality of RF inputs including satellite signals from at least two independent navigation satellite constellations, the satellite signals being received via an antenna array communicatively coupled to the receiver; processing the plurality of RF inputs via the RF front end to provide digital data, the digital data being derived from the RF inputs; providing the digital data from the RF front end to a core engine of the receiver; separating the digital data via the core engine of the receiver into a first digital data portion and a second digital data portion based upon relative data integrity levels of digital data included in the digital data portions, the first digital data portion having a first data integrity level, the second digital data portion having a second data integrity level, the first data integrity level being greater than the second data integrity level; providing the first digital data portion from the core engine of the receiver to a navigation engine of the receiver; receiving sensor data inputs from a sensor system, the sensor system being communicatively coupled to the receiver; and processing the sensor data inputs and the first digital data portion via the navigation engine of the receiver to determine the navigation solution, the navigation solution being derived from the first digital data portion and the sensor data inputs, the navigation solution being a position, velocity and time (PVT) navigation solution for the receiver.

A further embodiment of the present invention is directed to a computer program product, including: a non-transitory computer-readable storage medium including computer-usable program code for performing a method for determining a navigation solution via a receiver, the method including: receiving a plurality of RF inputs via a RF front end of the receiver, the plurality of RF inputs including satellite signals from at least two independent navigation satellite constellations, the satellite signals being received via an antenna array communicatively coupled to the receiver; processing the plurality of RF inputs via the RF front end to provide digital data, the digital data being derived from the RF inputs; providing the digital data from the RF front end to a core engine of the receiver; separating the digital data via the core engine of the receiver into a first digital data portion and a second digital data portion based upon relative data integrity levels of digital data included in the digital data portions, the first digital data portion having a first data integrity level, the second digital data portion having a second data integrity level, the first data integrity level being greater than the second data integrity level; providing the first digital data portion from the core engine of the receiver to a navigation engine of the receiver; receiving sensor data inputs from a sensor system, the sensor system being communicatively coupled to the receiver; and processing the sensor data inputs and the first digital data portion via the navigation engine of the receiver to determine the navigation solution, the navigation solution being derived from the first digital data portion and the sensor data inputs, the navigation solution being a position, velocity and time (PVT) navigation solution for the receiver.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present disclosure may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Currently, aircraft system architectures (ex.—aircraft platforms) rely on an inertial reference unit (IRU) and/or an inertial navigation system (INS) for supplying or augmenting their navigation solutions. However, implementing an IRU and/or an INS within such architectures may not be very efficient in terms of Size, Weight, Power and Cost (SWAP-C) considerations. The present disclosure provides a multiple constellation, GNSS-capable subsystem (ex.—an integrated GNSS/Navigation system) for implementation within a revised aircraft system architecture, which may eliminate the need for an INS and/or an IRU. The subsystem (ex.—integrated GNSS/navigation subsystem) of the present disclosure provides the ability to acquire and track multiple GNSS satellite constellations concurrently (ex.—simultaneously), thereby allowing for high integrity, accurate navigation solutions to be calculated and provided to other aircraft system architecture subsystems from the integrated GNSS/navigation subsystem. Further, the multiple constellation, GNSS-capable subsystem of the present disclosure may be implemented for providing area navigation and precision approaches, while eliminating the need for implementing an INS and/or an IRU for area navigation and precision approaches. Currently, the United States Global Positioning System (US GPS) is used for area navigation and non-precision approaches (NPAs). However, with augmentation, US GPS may have the ability to provide Category 1 (Cat 1) Localizer Performance with Vertical Guidance (LPV) approaches.

Figure 1:
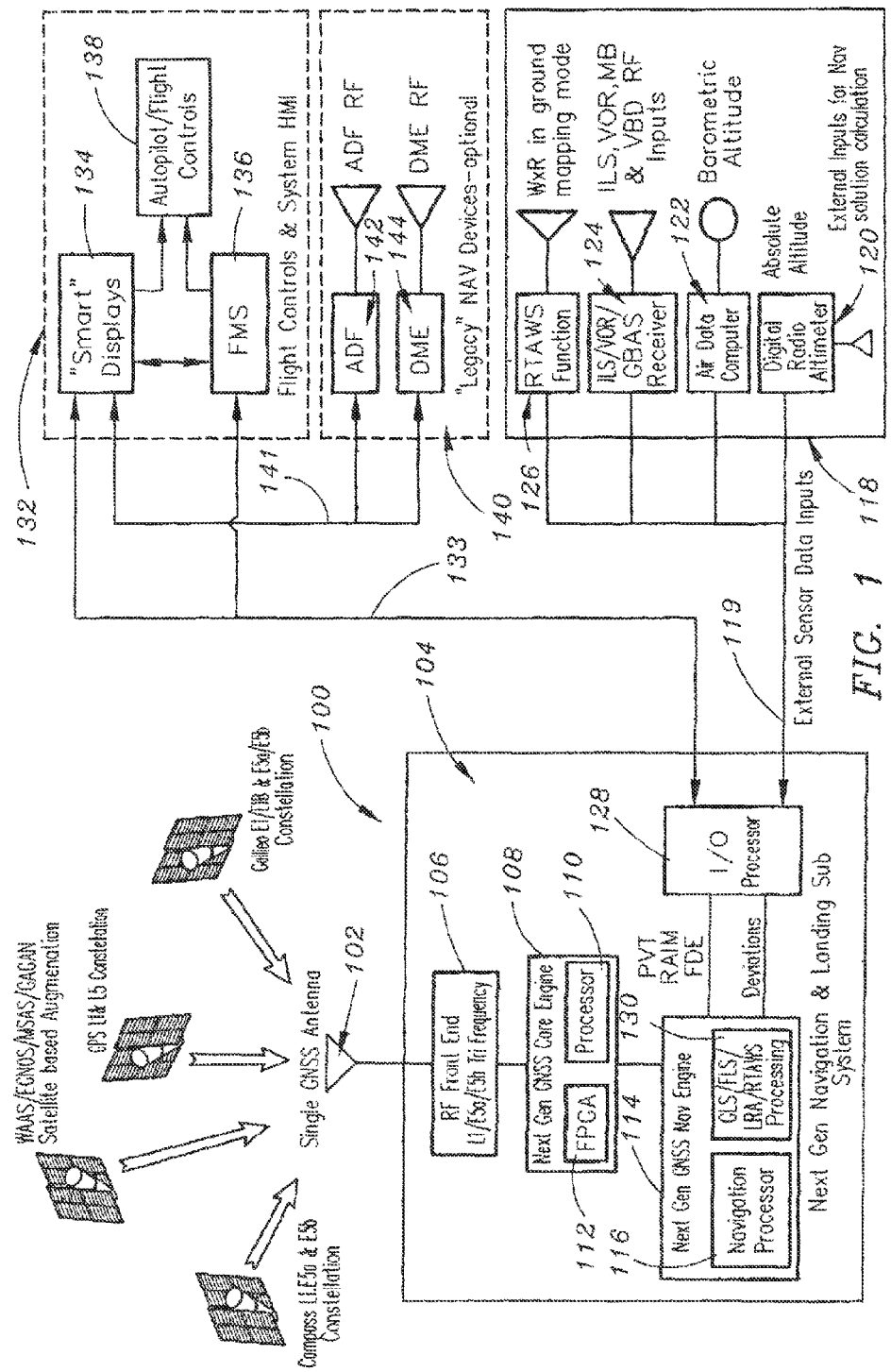
FIG. 1 is a block diagram schematic of a system for providing a blended navigation solution for a mobile platform (ex.—an aircraft) in accordance with an exemplary embodiment of the present disclosure.

Referring to FIG. 1, a system in accordance with an embodiment of the present disclosure is shown. The system 100 may be implemented on-board (ex.—may be connected to) a platform (exs.—a mobile platform; a vehicle) 150, such as an aircraft or a spacecraft. In an exemplary embodiment of present disclosure, the system 100 may be a navigation system, such as a Global Navigation Satellite Systems (GNSS) system.

In an embodiment of the present disclosure, the system 100 (ex.—aircraft navigation system architecture) may include one or more antennas (ex.—an antenna array) 102. The antenna array 102 may be a navigation antenna array (ex.—a GNNS antenna array). For example, the antenna array 102 may be configured for receiving signals, such as Radio Frequency (RF) signals (exs.—satellite signals; satellite navigation signals; satellite positioning signals).

In an exemplary embodiment of the present disclosure, the system 100 may include a receiver 104 (ex.—a GNSS receiver), the receiver 104 configured for being communicatively coupled (ex.—connected) to the antenna array 102. For instance, the receiver 104 may be a first subsystem (exs.—a navigation and landing subsystem; a multiple constellation GNSS-capable subsystem; an integrated GNSS/navigation subsystem; a universal channel-based tri-frequency GNSS system; a next generation (next gen) navigation and landing subsystem) of the system 100. In further embodiments of the present disclosure, the receiver 104 is configured for receiving RF inputs (exs.—RF data) from the antenna array 102, the RF inputs including the received RF signals (ex.—satellite signals). In still further embodiments, the receiver 104 of the system 100 may be configured for determining (ex.—dynamically determining) a navigation solution (exs.—a Position, Velocity and Time (PVT) solution; an in-flight position; an in-flight location) of the platform 150 based on the received RF inputs from the antenna array 102.

In an embodiment of the present invention, the receiver 104 includes a RF front end 106 (ex.—a tri-frequency RF front end). The RF front end 106 may be communicatively coupled to the antenna array 102 and may be configured for receiving the RF inputs provided by the antenna array 102. The RF front end 106 may further be configured (ex.—via circuitry and/or processing components of the RF front end 106) for processing the received RF inputs to provide digital data, said digital data being derived from said received RF inputs. For example, the digital data may be non-coherent or raw data derived from satellite signals transmitted by all satellites which are in view of the system 100.

In an exemplary embodiment of the present disclosure, the receiver 104 further includes a core engine 108 (ex.—a next gen GNSS core engine). The core engine 108 may be communicatively coupled to the RF front end 106. The core engine 108 may be configured for receiving the digital data from the RF front end 106. In further embodiments, the core engine 108 may include a processor 110. In still further embodiments, the core engine 108 may also include a Field Programmable Gate Array (FPGA) 112 which may be communicatively coupled to the processor 110. In further embodiments, the core engine 108 may be configured for processing the digital data via the processor 110, wherein processing includes separating the digital data into a plurality of data portions (ex.—a first digital data portion and a second digital data portion) based upon relative data integrity levels of the digital data. For instance, digital data included in the first digital data portion may have a higher data integrity level than digital data included in the second digital data portion.

In an embodiment of the present disclosure, the receiver 104 includes a navigation engine 114 (ex—a next gen GNSS nav engine). The navigation engine 114 may be communicatively coupled to the core engine 108. As mentioned above, the core engine 108 may be configured for separating the digital data into a plurality of digital data portions (ex.—a first digital data portion and a second digital data portion) based upon relative data integrity levels of the digital data. Further, the core engine 108 may be configured for selecting the first data portion (ex.—the data portion having the having a higher data integrity level) and providing the first digital data portion (ex.—providing only the first digital data portion (the selected digital data) and not the second digital data portion) to the navigation engine 114. In exemplary embodiments of the present disclosure, the navigation engine 114 may include one or more processors. For instance, the navigation engine 114 may include a first processor 116 (ex.—a navigation processor) which is configured for processing the selected data portion (ex.—selected digital data) provided to the navigation engine 114 by the core engine 108. During the processing of the selected data portion, the navigation processor 116 may process (ex.—convert) satellite position and time data included in the selected data portion to obtain a navigation solution (ex.—a Position, Velocity and Time (PVT) solution for the system 100.

In exemplary embodiments of the present disclosure, the system 100 may further include a sensor subsystem 118. The sensor subsystem 118 may be communicatively coupled to the receiver 104 via a bus 119 and may be configured for providing sensor data inputs (ex.—external sensor data inputs) to the receiver 104. In an embodiment of the present disclosure, the sensor subsystem 118 may include one or more of the following sensor data systems: an altimeter (ex.—a digital radio altimeter) 120; an air data computer 122; an Instrument Landing System (ILS) 124; a VHF omnidirectional range (VOR) system 124; a Ground Based Augmentation System (GBAS) 124, and/or a Radar Terrain Awareness and Warning System (RTAWS) 126. As mentioned above, the sensor subsystem 118 is configured for providing sensor data inputs to the receiver 104. In an embodiment of the present disclosure, the receiver 104 may include an input/output (I/O) processor 128 which is configured for receiving the external sensor data inputs from the sensor subsystem 118. In further embodiments of the present disclosure, the navigation engine 114 may include a second processor 130, which may be communicatively coupled with the first processor 116 of the navigation engine 114. Further, the second processor 130 of the navigation engine 114 may be communicatively coupled with the sensor subsystem 118 via the I/O processor 128 and may be configured for receiving and processing the sensor data inputs. Processing of the sensor data inputs (provided by the sensor subsystem 118) and the selected data portion (provided by the core engine 108) may result in the navigation engine 114 obtaining a navigation solution (ex.—a PVT solution and associated integrity information) for the system 100 which is based upon both the selected data portion (ex.—the high integrity satellite data) provided by the core engine 108 and the sensor data inputs provided by the sensor subsystem 118.

In an embodiment of the present disclosure, the system 100 may further include a flight controls-Human Machine Interface (system HMI) subsystem 132. The flight controls-HMI subsystem 132 may be communicatively coupled with the receiver 104 via a bus 133. The flight controls-HMI subsystem 132 may include a display system 134 including one or more displays (exs.—smart displays; touch screen display systems). The flight controls-HMI subsystem 132 may further include a Flight Management System (FMS) 136, the FMS being communicatively coupled with the display system 134. Further, the flight controls-HMI subsystem 132 may further include a flight control system 138 (ex.—an autopilot system) which may be communicatively coupled with the display system 134 and the FMS 136. In exemplary embodiments of the present disclosure, the flight controls-HMI subsystem 132 may be configured for receiving the navigation solution from the receiver 104. Further, the flight controls-HMI subsystem 132 may be configured for displaying the navigation solution via its display system 134 and/or for utilizing the navigation solution provided by the receiver 104 for carrying out tasks performed by the flight controls-HMI subsystem 132.

In exemplary embodiments of the present disclosure, the system 100 may further include a legacy navigation device subsystem 140. The legacy navigation device subsystem 140 may be communicatively coupled to the flight controls-HMI subsystem 132 via a bus 141. For example, the legacy navigation device subsystem 140 may include one or more legacy navigation devices, such as an automatic direction finder (ADF) 142 and/or distance measuring equipment (DME) 144.

In embodiments of the present disclosure, the satellite signals received by the system 100 may be concurrently provided to the system 100 from a plurality of independent satellite constellations. For example, the system 100 may concurrently receive satellite signals from a GPS satellite constellation (ex.—United States (US) GPS satellite constellation (L1, L5 frequency bands)), a Galileo satellite constellation (ex.—European Galileo satellite constellation (E1, E5a, E5b frequency bands)), a Compass satellite constellation (ex.—Chinese Compass (Beidou-2) satellite constellation (L1, E5a, E5b frequency bands), a Global Navigation Satellite System (GLONASS) constellation (ex.—Russian GLONASS constellation), a satellite-based augmentation satellite (SBAS) constellation (exs.—European Geostationary Navigation Overlay Service (EGNOS) constellation; a Multi-Functional Satellite Augmentation System (MSAS) constellation; a Ground-Based Augmentation System (GBAS) constellation; a Local Area Augmentation System (LAAS) constellation; a Wide Area Augmentation System (WAAS) constellation; and/or a GPS Aided Geo Augmented Navigation (GAGAN) constellation). The system 100 is configured for correlating data (ex.—concurrently processing data) from the signals provided by the above-referenced plurality of independent satellite constellations to obtain the navigation solution (ex.—PVT solution) for the platform 150. This ability to correlate data from multiple independent satellite constellations allows the system 100 of the present disclosure to calculate a PVT solution to a far higher integrity level than systems which only utilize data from a single satellite constellation. Further, by concurrently utilizing data from satellite signals obtained from a plurality of independent satellite constellations in calculating its PVT solution, the system 100 of the present disclosure overcomes weaknesses inherent in currently available systems, which rely on only a single satellite constellation. For example, by relying on only a single satellite constellation in calculating their navigation solutions, currently available systems may suffer from periodic signal integrity issues caused by multiple factors, such as ionospheric interference, satellite visibility and satellite availability. Further, multi-frequency signals from the same satellite may be used for determining ionospheric delays. Still further, a PVT solution and associated integrity information may be calculated using integrated solution(s) from all constellation systems and by computing the integrated solution(s)) independently of each other. In further embodiments, a multi-constellation, multi-signal tracking loop architecture may be utilized, which effectively allows tracking loop aiding of one satellite with another.

As discussed above, the system 100 of the present disclosure is a Universal Channel-based, multi-frequency (ex.—tri-frequency) GNSS system which is configured for receiving current and proposed future GNSS signals. The receiver 104 of the system 100 may provide a Universal Channel, software acquisition-based GNSS engine which may form the core of potential future aircraft navigation system architecture. By combining satellite constellation signal data with other external reference data sources provided via, for example, Air Data Computer, Radio Altimeter and Weather Radar-based ground mapping data (ex.—RTAWS data), the system 100 of the present disclosure may provide a solution which eliminates the need for an Inertial Reference System for enroute navigation information, thereby promoting SWAP-C advantages over currently available systems. Further, with augmentation (as may be provided by the receiver 104 via processing of satellite-based augmentation constellation satellite signals, the system 100 of the present disclosure may provide high integrity LPV and/or Glide Slope (GLS) approach and landing data up to Category II and/or Category III levels.

Figure 2:
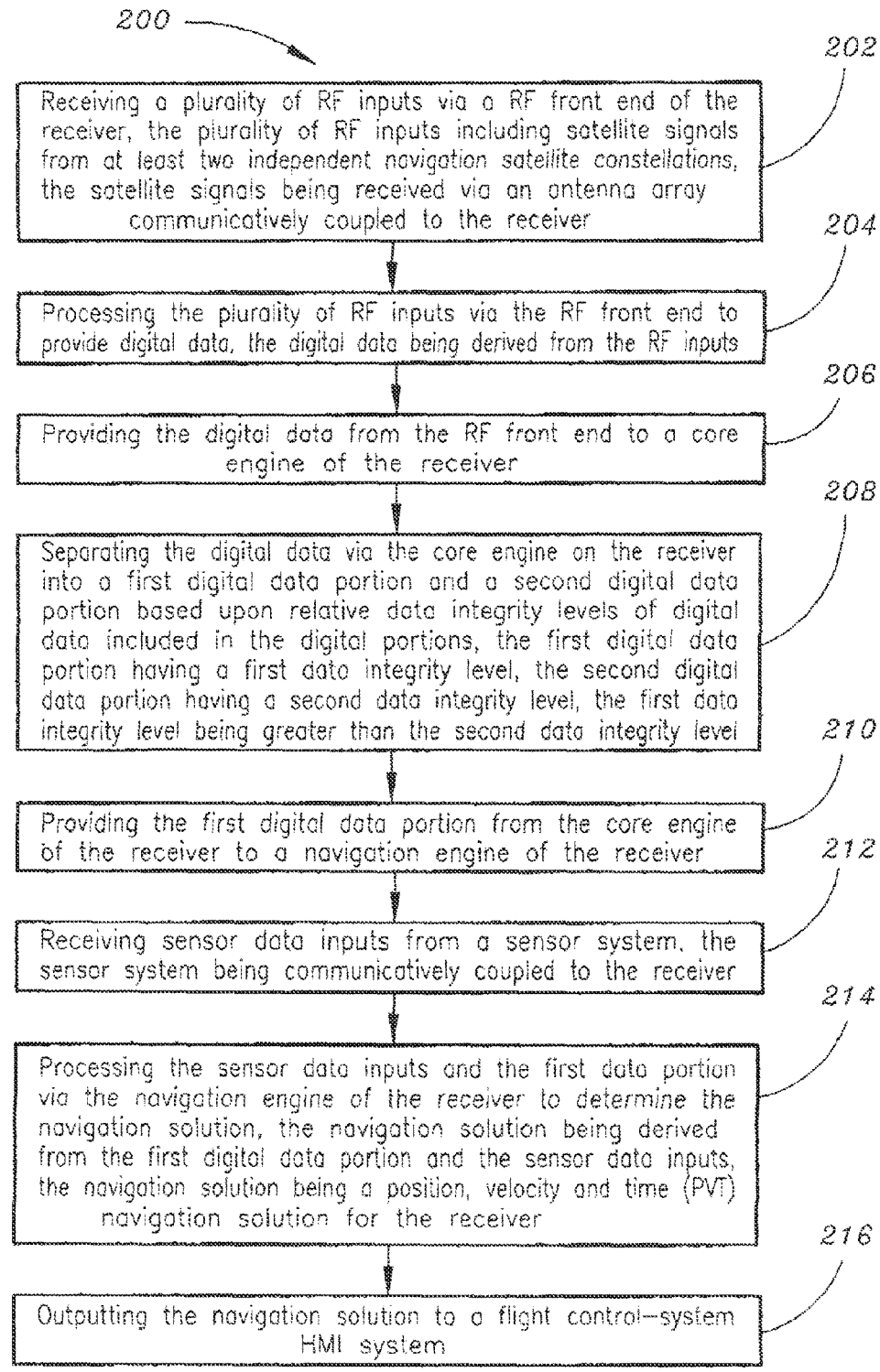
FIG. 2 is a flowchart illustrating a method for providing a blended navigation solution for a mobile platform (ex.—an aircraft) via the system shown in FIG. 1 in accordance with an exemplary embodiment of the present disclosure.

Referring to FIG. 2, a flow chart is shown which illustrates a method for determining a navigation solution via a receiver (such as the receiver 104 described above) in accordance with an exemplary embodiment of the present disclosure. The method 200 may include the step of receiving a plurality of RF inputs via a RF front end of the receiver, the plurality of RF inputs including satellite signals from at least two independent navigation satellite constellations, the satellite signals being received via an antenna array communicatively coupled to the receiver 202. In further embodiments, the method 200 may further include the step of processing the plurality of RF inputs via the RF front end to provide digital data, the digital data being derived from the RF inputs 204. In still further embodiments, the method 200 may further include the step of providing the digital data from the RF front end to a core engine of the receiver 206.

In exemplary embodiments of the present disclosure, the method 200 may further include the step of separating the digital data via the core engine of the receiver into a first digital data portion and a second digital data portion based upon relative data integrity levels of digital data included in the digital data portions, the first digital data portion having a first data integrity level, the second digital data portion having a second data integrity level, the first data integrity level being greater than the second data integrity level 208. In further embodiments, the method 200 may further include the step of providing the first digital data portion from the core engine of the receiver to a navigation engine of the receiver 210. In still further embodiments, the method 200 may further include the step of receiving sensor data inputs from a sensor system, the sensor system being communicatively coupled to the receiver 212.

In an embodiment of the present disclosure, the method 200 may further include the step of processing the sensor data inputs and the first digital data portion via the navigation engine of the receiver to determine the navigation solution, the navigation solution being derived from the first digital data portion and the sensor data inputs, the navigation solution being a position, velocity and time (PVT) navigation solution for the receiver 214. In further embodiments, the method 200 may further include the step of outputting the navigation solution to a flight controls-system HMI system 216.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a non-transitory computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system for determining a navigation solution, comprising:
   a Radio Frequency (RF) front end configured for receiving a plurality of RF inputs, the plurality of RF inputs including satellite signals received via an antenna array from two or more independent navigation satellite constellations, the antenna array being communicatively coupled to the RF front end, the RF front end being further configured for processing the plurality of RF inputs to provide digital data;
   a core engine, the core engine being communicatively coupled to the RF front end, the core engine being configured for receiving the digital data from the RF front end, the core engine including a processor, the processor configured for concurrently processing digital data derived from signals received from the two or more independent navigation satellite constellations, the processing including separating the digital data into a plurality of data portions, selecting a data portion, and not selecting at least one data portion of the plurality of data portions;
   a sensor subsystem including at least one sensor, the sensor subsystem communicatively coupled to the system by at least one first bus and configured for providing at least one sensor data input to the system via the at least one first bus; and
   a navigation engine, the navigation engine being communicatively coupled to the core engine, the navigation engine configured for receiving the selected data portion from the core engine and the at least one sensor data input from the sensor subsystem, the navigation engine configured for processing the selected data portion to dynamically determine a navigation solution, the navigation solution being derived from the selected data portion and the at least one sensor data input.

2. The system of claim 1, wherein the navigation solution is a position, velocity and time (PVT) navigation solution.

3. The system of claim 2, wherein the RF front end and the core engine comprise a receiver, and wherein the receiver is configured for outputting the PVT navigation solution to a flight controls-system Human Machine Interface (HMI) system, the flight controls-system HMI system being communicatively coupled to the system by at least one second bus.

4. The system of claim 2, wherein the system is on-board a mobile platform.

5. The system of claim 4, wherein the mobile platform is an aircraft.

6. The system of claim 1, wherein the sensor subsystem includes at least one of: an altimeter, an air data computer, an Instrument Landing System (ILS), a VHF omnidirectional range (VOR) system, a Ground Based Augmentation System (GBAS), and a Radar Terrain Awareness and Warning System (RTAWS).

7. The system of claim 1, wherein the two or more satellite navigation constellations include two or more of: a GPS satellite constellation, a Galileo satellite constellation, a Compass satellite constellation, a Global Navigation Satellite System (GLONASS) constellation and a satellite-based augmentation satellite (SBAS) constellation.

8. The system of claim 1, wherein the core engine is configured for selecting the data portion based on an integrity level of the selected data portion.

9. The system of claim 8, wherein the core engine is further configured to select the selected data portion based on the integrity level relative to an integrity level of the at least one data portion not selected.

10. A method for determining a navigation solution via a receiver, the method comprising:
receiving a plurality of RF inputs via a RF front end of the receiver, the plurality of RF inputs including satellite signals from two or more independent navigation satellite constellations, the satellite signals being received via an antenna array communicatively coupled to the receiver;
processing the plurality of RF inputs via the RF front end to provide digital data;
receiving at least one sensor data input from a sensor subsystem communicatively coupled to the receiver by at least one first bus;
providing the digital data from the RF front end to a core engine of the receiver;
concurrently processing via the core engine of the receiver the digital data derived from signals received from the two or more independent navigation satellite constellations, the processing including separating the digital data into a plurality of data portions, selecting a data portion, and not selecting at least one data portion of the plurality of data portions;
providing the selected data portion from the core engine to a navigation engine of the receiver;
providing the at least one sensor data input from the sensor subsystem to the navigation engine; and
processing the sensor data inputs and the selected data portion via the navigation engine to determine the navigation solution, the navigation solution derived from the selected data portion and the sensor data inputs.

11. The method of claim 10, further comprising:
outputting the navigation solution to a flight controls-system HMI system via at least one second bus.

12. The method of claim 10, wherein the navigation solution is a position, velocity and time (PVT) navigation solution for the receiver.

13. The method of claim 10, wherein
receiving at least one sensor data input from a sensor subsystem communicatively coupled to the receiver by at least one first bus includes:
receiving at least one sensor data input via the at least one first bus from at least one of an altimeter, an air data computer, an Instrument Landing System (ILS), a VHF omnidirectional range (VOR) system, a Ground Based Augmentation System (GBAS), and a Radar Terrain Awareness and Warning System (RTAWS).

14. A computer program product, comprising:
a non-transitory computer-readable storage medium including computer-usable program code for performing a method for determining a navigation solution via a receiver implemented on-board a mobile platform, the method including:
receiving a plurality of RF inputs via a RF front end of the receiver, the plurality of RF inputs including satellite signals from two or more independent navigation satellite constellations, the satellite signals being received via an antenna array communicatively coupled to the receiver;
processing the plurality of RF inputs via the RF front end to provide digital data;
receiving at least one sensor data input from a sensor subsystem communicatively coupled to the receiver by at least one first bus;
providing the digital data from the RF front end to a core engine of the receiver; and
concurrently processing via the core engine of the receiver the digital data derived from signals received from the two or more independent navigation satellite constellations, the processing including separating the digital data into a plurality of data portions, selecting a data portion of the plurality of data portions, and not selecting at least one of the plurality of data portions;
providing the selected data portion from the core engine to a navigation engine of the receiver;
providing the at least one sensor data input from the sensor subsystem to the navigation engine; and
processing the sensor data inputs and the selected data portion via the navigation engine to determine the navigation solution, the navigation solution derived from the selected data portion and the sensor data inputs.

15. The computer program product of claim 14, the method further including:
outputting the navigation solution to a flight controls-system HMI system via at least one second bus.

16. The computer program product of claim 14, wherein receiving at least one sensor data input from a sensor subsystem communicatively coupled to the receiver by at least one first bus includes:
receiving at least one sensor data input via the at least one first bus from at least one of an altimeter, an air data computer, an Instrument Landing System (ILS), a VHF omnidirectional range (VOR) system, a Ground Based Augmentation System (GBAS), and a Radar Terrain Awareness and Warning System (RTAWS).

* * * * *